(12) United States Patent
Murdica et al.

(10) Patent No.: US 10,461,922 B2
(45) Date of Patent: Oct. 29, 2019

(54) METHOD AND SYSTEM FOR PROTECTING A CRYPTOGRAPHIC OPERATION

(71) Applicant: SECURE-IC SAS, Cesson-Sévigné (FR)

(72) Inventors: Cédric Murdica, Rennes (FR); Sylvain Guilley, Paris (FR)

(73) Assignee: SECURE-IC-SAS, Cesson-Sévigné (FR)

( * ) Notice: Subject to any disclaimer, the term of this patent is extended or adjusted under 35 U.S.C. 154(b) by 205 days.

(21) Appl. No.: 15/391,265

(22) Filed: Dec. 27, 2016

(65) Prior Publication Data

US 2017/0187519 A1 Jun. 29, 2017

(30) Foreign Application Priority Data

Dec. 29, 2015 (EP) ..................................... 15307160

(51) Int. Cl.
*H04L 29/06* (2006.01)
*H04L 9/00* (2006.01)
*H04L 9/06* (2006.01)

(52) U.S. Cl.
CPC ............ *H04L 9/004* (2013.01); *H04L 9/0631* (2013.01); *H04L 2209/12* (2013.01); *H04L 2209/34* (2013.01)

(58) Field of Classification Search
None
See application file for complete search history.

(56) References Cited

U.S. PATENT DOCUMENTS 5,991,415 A 11/1999 Shamir
6,144,740 A * 11/2000 Laih .................... G06F 21/75
380/2

FOREIGN PATENT DOCUMENTS

FR 2884088 A1 10/2006

OTHER PUBLICATIONS

Ciet et al., "Practical Fault Countermeasure for Chinese Remaindering Based RSA (Extended Abstract)", Fault Diagnosis and Tolerance in Cryptography? FDTC?05,, Sep. 2, 2005 (Sep. 2, 2005), pp. 121-131, XP007906966. (Year: 2005).*

(Continued)

*Primary Examiner* — Andrew J Steinle
(74) *Attorney, Agent, or Firm* — Meagher Emanuel Laks Goldberg & Liao, LLP

(57) ABSTRACT

There is provided a device or a method for executing an operation of a cryptographic scheme, the operation being applied to a given state of a data block of original data, the operation being defined in a basis ring corresponding to the quotient of a starting ring by a basis ideal generated by at least one element of the starting ring. The operation is executed from a state derived from the current state of the data block, in at least one reference ring, which provides a reference value for each reference ring, each reference ring being the quotient of the starting ring by a reference ideal. The operation is executed from the state derived from the current state of the data block in at least one extended ring corresponding to one or more reference rings, which provides at least one extension value for each extended ring, each extended ring corresponding to one or more reference ring being the quotient of the starting ring by the product of the basis ideal and of the reference ideals of the one or more corresponding reference rings.

17 Claims, 11 Drawing Sheets

(56) References Cited

OTHER PUBLICATIONS

Gilles Piret, Jean-Jaques Quisquater, "A Differential Fault Attack Technique against SPN Structures, with Application to the AES and KHAZAD", C.D. Walter et al. (Eds.): CHES 2003, LNCS 2779, pp. 77-88, 2003 (Year: 2003).*
European Search Report for 15307160.0 dated Jun. 30, 2016.
Ciet et al., "Practical Fault Countermeasure for Chinese Remaindering Based RSA (Extended Abstract)", Fault Diagnosis and Tolerance in Cryptography? FDTC?05,, Sep. 2, 2005 (Sep. 2, 2005), pp. 121-131, XP007906966.
Schmidt et al., "Countermeasures for Symmetric Key Ciphers", Fault Analysis in Cryptography part of the Series Information Security and Cryptography, Jun. 21, 2012 (Jun. 21, 2012), pp. 73-87.
Rao et al., "Cyclic and Multiresidue Codes for Arithmetic Operations", IEEE Transaction on Information Theory, IEEE Press, USA, Jan. 1, 1971, pp. 85-91.
Gilles Piret, Jean-Jaques Quisquater, "A Differential Fault Attack Technique against SPN Structures, with Application to the AES and KHAZAD", C.D. Walter et al. (Eds): CHES 2003, LNCS 2779, pp. 77-88, 2003.

\* cited by examiner ic parameter related to a set of reference rings with the common extension parameter obtained for the extended ring depending on the set of reference rings.

METHOD AND SYSTEM FOR PROTECTING A CRYPTOGRAPHIC OPERATION

BACKGROUND

The invention generally relates to data securing in computing systems, and in particular to methods, systems, and computer program products for protecting a cryptographic operation.

There exist different types of cryptographic algorithms which are used for encrypting and decrypting data, for authentication or signing. Cryptographic algorithms use secret keys and are based on a succession of several operations that are applied on different states of data blocks that are to be encrypted and provide an encrypted data lock.

However, encryption algorithms may be subject to "attacks" intended to access to the secret keys.

In particular, fault attacks on embedded systems have become a real threat. Fault attacks cause an abnormal condition or defect at a level of the target system, thereby resulting in a failure of the target system. If fault attacks cannot lead to a full control of the attacker over the target system, they may change the operation of the target system. For example, fault attacks may be implemented by an attacker to disturb the target system by using a laser, by varying the supply voltage, by varying the external clock or other methods. The possibly erroneous result can reveal information of the targeted secret data, e.g. a cryptographic key.

There exist fault attacks aiming at violating the confidentiality of the secret keys of a cryptographic algorithm, such as RSA (Rivest, Shamir, & Adleman). A cryptographic algorithm provides an encryption algorithm and a corresponding decryption algorithm. An encryption algorithm (similarly a decryption algorithm) comprises a succession of linear and/or nonlinear operations, each operation applying to a state of a block of the original data (e.g. message).

There exist countermeasures against such fault attacks against RSA, such as FR2884088 or U.S. Pat. No. 5,991,415 A. However this solution is specific to RSA and cannot be applied to any cryptographic algorithm such as for example the Advanced Encryption Standard (AES) which is known to be vulnerable to fault attacks as disclosed in "A Differential Fault Attack Technique against SPN Structures, with Application to the AES and KHAZAD", CHES 2003, by Gilles Piret and Jean-Jacques Quisquater.

There is accordingly a need for improved methods, systems, computer programs capable of protecting any cryptographic algorithm against fault attacks.

SUMMARY

There is provided a device for executing an operation of a cryptographic scheme, the operation being applied to a given state of a data block of original data, the operation being defined in a basis ring corresponding to the quotient of a starting ring by a basis ideal generated by at least one element of the starting ring. The device comprises:
  a first execution unit configured to execute the operation from a state derived from the current state of the data block, in at least one reference ring, which provides a reference value for each reference ring, each reference ring being the quotient of the starting ring by a reference ideal, and
  a second execution unit configured to execute the operation from the state derived from the current state of the data block in at least one extended ring corresponding to one or more reference rings, which provides at least one extension value for each extended ring, each extended ring corresponding to one or more reference ring being the quotient of the starting ring by the product of the basis ideal and of the reference ideals of the one or more corresponding reference rings.

The device is further configured to determine the result of the operation from at least one of the reference values and/or of the extension values depending on the verification of a condition between the reference value obtained for each reference ring and the extension values obtained for the extended rings corresponding to the reference ring.

The device may further comprise a state updating unit configured to:
  select a set of elements of the reference ring in the basis ideal;
  update the current state of the data block from the selected elements, which provides the state derived from the current state of the data block.

In certain embodiments, the second execution unit is configured to:
  execute the operation from the state derived from the current state of the data block in the extended ring, which provides an intermediary value for each extended ring;
  map each byte of the intermediary value resulting from the execution of the operation in the extended ring to an element of the reference ring associated with the reference ring, which provides an extension value corresponding to the reference ring,
  the condition comprising a comparison between each reference value and the extension value corresponding to the reference ring.

The condition may be verified if each reference value matches each extension value corresponding to the reference ring, the result of the operation depending on the verification of the condition for each reference value.

The first execution unit may be configured to execute the operation in at least two reference rings, and the second execution unit may be configured to execute the operation in a unique extended ring depending on all the reference rings, the device being further configured to apply a CRT transformation to all the reference values determined by the first execution unit, which provides a reference parameter related to the set of reference rings, the condition comprising determining if the reference parameter related to a set of reference rings is equal to the element corresponding to the extension value obtained for the extended ring in an ideal represented by the product of the reference ideals of the at least two reference rings.

In certain embodiments, the first execution unit may be configured to execute the operation in at least two reference rings, while the second execution unit is configured to execute the operation in at least two extended rings, each extended ring depending on a set of reference rings, the device further comprising applying a transformation according to the Chinese Remainder Theorem to each reference value determined by the first execution unit, which provides a common reference parameter related to each set of reference rings. For each extension value obtained as a result of the execution of the operation in an extended ring depending on a given set of reference rings, the device may be further configured to map each byte of the extension value to an element of a ring quotiented by the product of the reference ideals of each reference ring of the set of reference rings, which provides a common extension parameter, the condition comprising comparing each common reference parameter related to a given set of reference rings to the common extension parameter obtained for the extended rings depending on the set of reference rings.

In certain embodiments, the device may be further configured, in response to the verification of the condition, for at least one extension value, to map each byte of the at least one extension value to an element of the basis ring, which provides a mapped value corresponding to the at least one extension value.

Alternatively, the device may be configured to check an auxiliary condition, the auxiliary condition comprising comparing at least some of the mapped values to the reference values, the device comprising triggering a termination of the operations of the cryptographic scheme if at least one mapped value differs from a reference value.

The device may be configured to return one of the mapped values as the operation result if the auxiliary condition is verified.

The first execution unit may be configured to execute the operation in a plurality of reference rings, which provides a set of reference values, while the second execution unit is configured to execute the operation in a unique extended ring corresponding to one or more reference rings.

There is also provided a system for executing a cryptographic scheme comprising a set of successive operations on a given data block of original data using at least one secret key, the system comprising an operation execution device according to any preceding claim configured to protect at least one operation of the cryptographic scheme.

The operation execution device may be applied to each operation of the cryptographic scheme.

The cryptographic scheme may comprise a plurality of rounds, and the operation execution device may be applied to protect at least one operation of at least one round.

The cryptographic scheme may be an Advanced Encryption Standard scheme comprising a first non-linear substitution operation at each round, the non-linear substitution operation replacing each byte of a data block with another according to a lookup table, and successive operations.

The successive operations may comprise a final combination operation at each round, the combination operation combining each byte of the state of a data block with a block of the round key using a bitwise XOR operator, while the operation execution device may be only applied to the final combination operation at least one round.

There is further provided a method of executing an operation of a cryptographic scheme, the operation being applied to a given state of a data block of original data, the operation being defined in a basis ring corresponding to the quotient of a starting ring by a basis ideal generated by at least one element of the starting ring, the method comprising executing the operation from a state derived from the current state of the data block, in at least one reference ring, which provides a reference value for each reference ring, and in at least one extended ring corresponding to one or more reference rings, which provides at least one extension value for each extended ring, each reference ring being the quotient of the starting ring by a reference ideal, and each extended ring corresponding to one or more reference ring being the quotient of the starting ring by the product of the basis ideal and of the reference ideals of the one or more corresponding reference rings, the method further comprising determining the result of the operation from at least one of the reference value and/or of the extension values depending on the verification of a condition between the reference value obtained for each reference ring and the extension values obtained for the extended rings corresponding to the reference ring.

There is also provided a computer program product for executing an operation of a cryptographic scheme, the operation being applied to a given state of a data block of original data, the operation being defined in a basis ring corresponding to the quotient of a starting ring by a basis ideal generated by at least one element of the starting ring, the computer program product comprising:

a non-transitory computer readable storage medium; and
instructions stored on the non-transitory computer readable storage medium that, when executed by a processor, cause the processor to execute the operation from a state derived from the current state of the data block, in at least one reference ring, which provides a reference value for each reference ring, and in at least one extended ring corresponding to one or more reference rings, which provides at least one extension value for each extended ring, each reference ring being the quotient of the starting ring by a reference ideal, and each extended ring corresponding to one or more reference ring being the quotient of the starting ring by the product of the basis ideal and of the reference ideals of the one or more corresponding reference rings, the computer product program being further caused to determine the result of the at least operation from at least one of the reference value and/or of the extension values depending on the verification of a condition between the reference value obtained for each reference ring and the extension values obtained for the extended rings corresponding to the reference ring.

Embodiments of the invention thus allow detection of a fault-attack before the fault attack results in a failure, in an improper operation or an alteration of the data.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the present invention provide an improved method and system for executing a set of cryptographic operations on data, depending on the function of the application system in which the set of cryptographic operations occur. The application system may be an embedded system such as a smartcard implementing cryptographic operations to protect the data.

Figure 1:
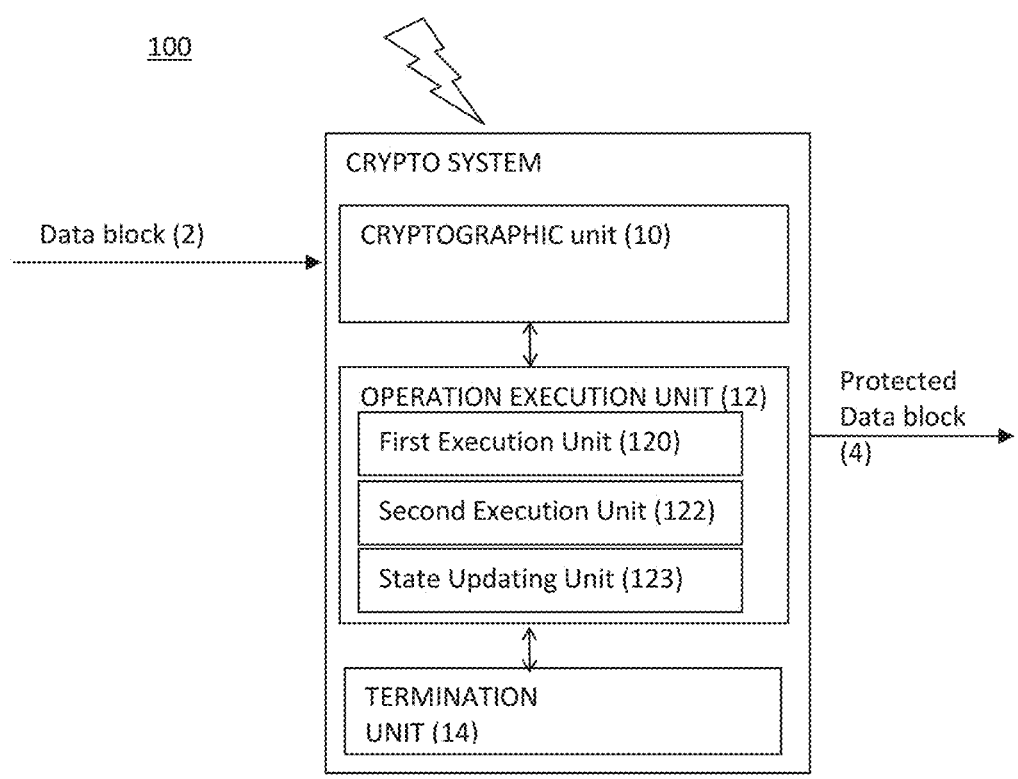
FIG. 1 illustrates a cryptographic system comprising a cryptographic processing unit implementing a cryptographic scheme, according to certain embodiments.

FIG. 1 illustrates a system 100 comprising a cryptographic processing unit 10 (also referred to as a cryptosystem) implementing a cryptographic scheme 1 such as an encryption scheme, a decryption scheme or a signature scheme, using at least one secret key K to protect the data portions (also referred hereinafter as a data block) of incoming data. The incoming data may be for example binary data including N data blocks (referred to as "plaintext" for an encryption scheme), each block being a K-bit word of the incoming binary data. The cryptosystem 100 outputs a protected data block as a result of the execution of the operations defined by the cryptographic scheme 1 (referred to as "ciphered text" for an encryption scheme).

As used herein, a "key" or a "secret key" refers to is a parameter used to implement a cryptographic operation. Each key may be any bit size. The cryptographic scheme comprising a set of successive operations, each executed on a current state of the data block 2 in a given starting ring. The cryptographic scheme 1 may include for example a symmetric key cryptographic function such as AES scheme (Advanced Encryption Standard), asymmetric key cryptographic functions, a hash function, etc.

The cryptographic processing unit 10 may comprise logic for performing one or more rounds of the set of successive operations on the data block 2 (for example encryption operations on plaintext and/or decryption operations on ciphertext) using the keys. The keys may be provided by a key storage unit (not shown). The result of the successive operations 4 may be loaded into a result storage unit.

To facilitate the understanding of certain embodiments of the invention, definitions of certain elements and notations are provided below:
- a ring designates communicative group with a second binary operation that is associative, distributive over the group operation and has an identity element. Usually, the two group operations are the addition and the multiplication. For example, the ring of integers $\mathbb{Z}$ with the group operations $+, \times$ is a ring with the additive neutral element 0 and multiplicative neutral element 1
- a field is a ring in whose nonzero elements form a commutative group under multiplication. For example, $\mathbb{Z}$ is not a field. However, the set of rational number $\mathbb{Q}$ is a field.
- a finite field refers to a field with a finite number of elements. Since all fields of size n are isomorphic, the field with n elements is usually denoted $\mathbb{F}_n$. $\mathbb{F}_2$ is the smaller field containing 0 and 1. The addition is the XOR bit-operation, the multiplication is the AND bit-operation.
- an ideal I of a ring A is a subgroup of A which is stable by multiplication: for every element x in I and every element a in A, $ax \in I$. For example, in the ring $\mathbb{Z}$, the multiples of 5 is an ideal, denoted $5\mathbb{Z}$.
- The product of two ideals I,J, denoted IJ, is an ideal generated by all elements xy with $x \in I$ and $y \in J$. Considering an ideal I of A, and a, $b \in A$, if $a-b \in I$, a and b are equal modulo I.
- the quotient ring A/I is the elements of A modulo I. If a and b are equal modulo I, then a and b are represented by the same element in A/I.

As used herein, the operation which maps a or b to the same element in A/I is referred to as a "modular reduction. The modular reduction of an element a modulo an ideal I will thus designate the operation consisting in mapping a to an element in A/I. In the following description of certain embodiments of the invention, the expression "reduced value" or "mapped value" will be used to designate the result of a modular reduction;

When the ring A is the ring $\mathbb{Z}$ of the integers and the ideal I is $n\mathbb{Z}$, then, by convention, A/I is represented by the integers comprised between 0 and n−1. The modular reduction of an element a by the ideal consists in returning the remainder of the division of a by n.

When A is a finite field with a number of elements $p^m$, where p is a prime, and I is the ideal of the multiple of a polynomial P, denoted (P), A/I (A quotiented by I) is represented by the polynomials of degree smaller than P, with coefficients in A. The operation modular reduction of an element A by the ideal consists in returning the remainder of the division of a by P.

An element x in $\mathbb{F}_q[X]/I$ is noted "x mod I".

Two ideals I,J are said coprime if 1 can be written as a combination of elements of I and J. For example, in $\mathbb{F}$, $5\mathbb{F}$ and $3\mathbb{F}$ are coprime since 10−9=1 and $10 \in 5\mathbb{F}$ and $9 \in 3\mathbb{F}$. $3\mathbb{F}$ and $6\mathbb{F}$ are not coprime.

Further, as used herein:
- a starting ring, noted A, in relation with a cryptographic operation on a data block refers to the ring defined for the cryptographic operation;
- a basic ring, noted A/J, refers to the quotient of said starting ring by a basis ideal J generated by at least one element of the starting ring;
- a reference ring, noted $A/I_k$, refers to the quotient of said starting ring by a reference ideal $I_k$, k being an integer;
- an extended ring, noted $A/JI_{k1}I_{k2} \ldots I_{kN}$, refers to the quotient of the starting ring by the product of the basis ideal $I_{k1}I_{k2} \ldots I_{kN}$ and of the reference ideal J;
- an extension value, noted $C_{r, k1k2 \ldots kN}$, refers to the result of a cryptographic operation run in an extended ring;
- a reference value, noted $C_k$, refers to the result of a cryptographic operation run in a reference ring $A/I_k$;

According to an aspect of the invention, the cryptographic system 100 further comprises an operation executing device 12 for executing at least one of the operation of the cryptographic scheme 1 in a given basis ring. The operation executing device 12 may comprise a first execution unit 120 for executing the operation on a state of the data block m' derived from the current state of data block m in at least one reference ring and a second execution unit 122 for executing the operation in at least one extended ring and by checking a condition between:

at least one value derived from the results of the operation executed in one or more reference rings, and at least one value derived from the result of the operation executed in one or more extended rings.

If the condition is not verified, a fault attack is detected, and a termination unit 14 may terminate the execution of the operations by the cryptographic processing unit 10. In addition, an alarm may be triggered or the error may be notified.

If the condition is verified, the execution of the operations by the cryptographic processing unit 10 proceeds. The result of the operation executed in the reference rings and/the result of the operation executed in the extended ring.

In addition, an alarm may be triggered or the error may be notified.

The operation executing device 12 may further comprise a state updating unit 123 configured to update the current state of the data block from elements selected in the basis ideal J.

Embodiments of the invention thus allow detection of an abnormal condition or defect at a component or system level triggered by a fault-attack before the fault attack results in a failure or an improper operation or an alteration of the data.

Figure 2:
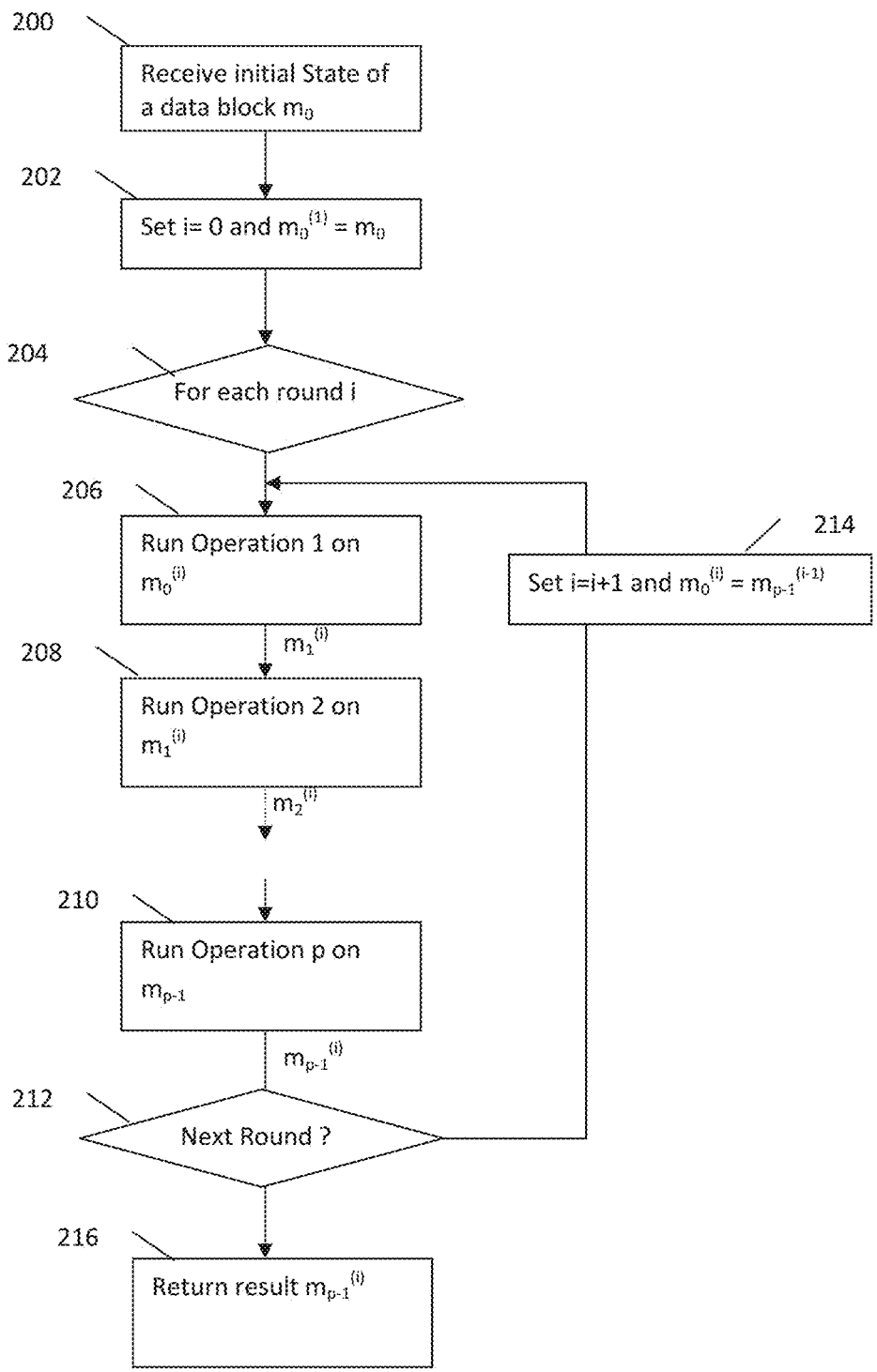
FIG. 2 represents successive mathematical operations of a cryptographic scheme.

As represented in FIG. 2, the cryptographic protection of a given message is typically implemented by applying one or more successive mathematical operations to this message, the operations being functions of at least one secret key and being defined in a ring A.

The conventional cryptographic processing method starts on the reception of an initial state of data block $m_0$ (200).

In step 202, the round index i is initialized. For each round i (204), the set of successive operations are performed in a given ring (steps 206 to 210). This comprises running a first operation on the initial state of the data block $m_0$, in the given ring, which provides a new state of the data block $m_0^{(1)}$, in step 206. In step 208, the next operation (operation 2) is then run on the new state of the message $m_0^{(1)}$ in the given ring, which provides an new state of the message $m_1^{(1)}$. When the last round has been executed, the operation result is returned in step 216.

The remaining operations j are similarly executed on each state of the message $m_j^{(1)}$, until the last operation p is run (step 210) which provides a final state of the data block for the current round $m_{p-1}^{(1)}$. If the cryptographic scheme comprises several rounds of the successive operations, steps 206 to 212 are iterated for each round I based on the final state of the data block $m_{p-1}^{(i-1)}$ obtained for the previous round i-1.

To overcome the vulnerability of conventional cryptographic processing method to fault attack, there is provided a method for executing at least one of the operations of the set of successive mathematical operations defined in a starting ring by the cryptographic scheme, in a way that protect the operation against fault attack (the operation executing method will be also referred to hereinafter as an "operation protection method").

Figure 3:
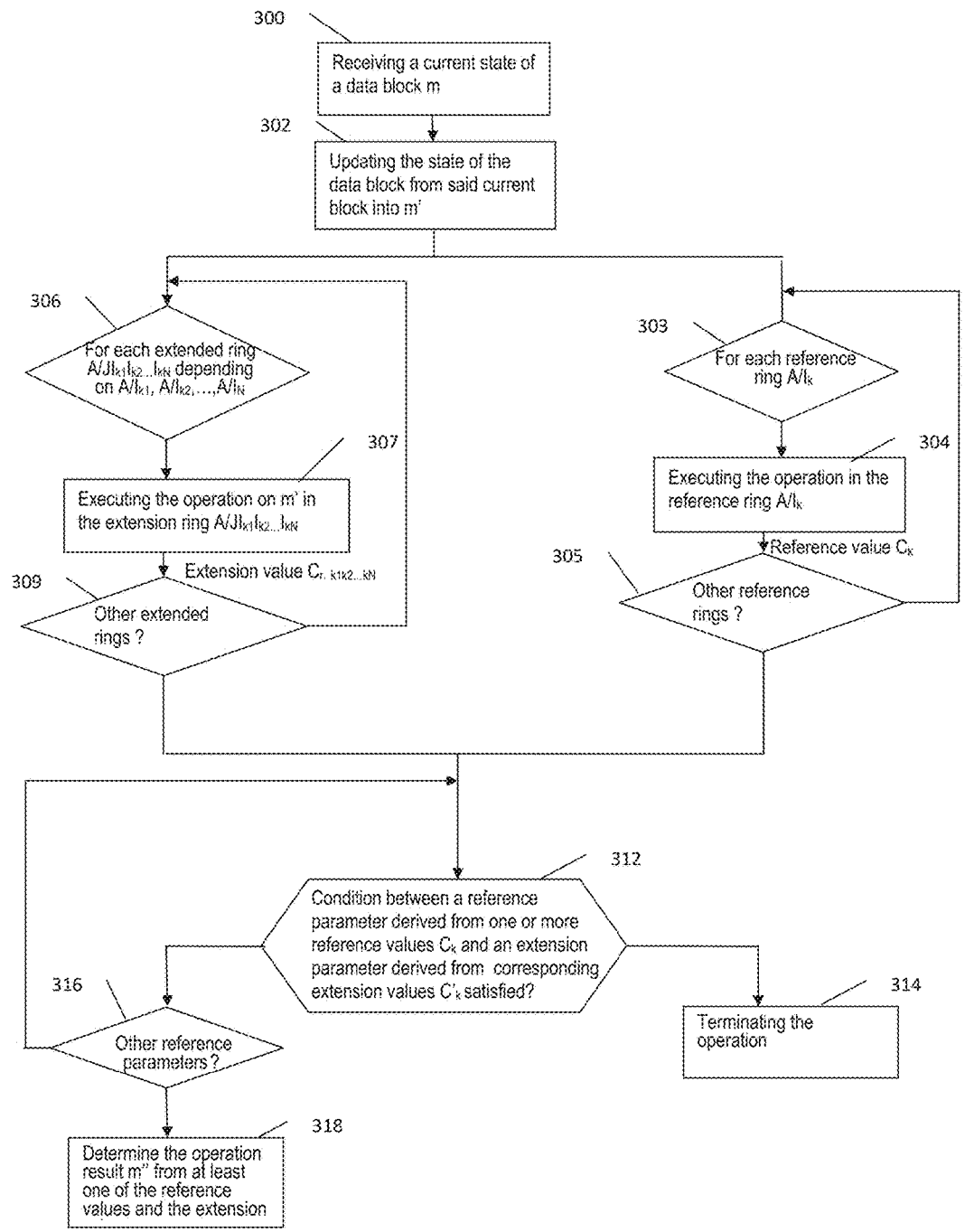
FIG. 3 is a flowchart depicting the operation protection method according to certain embodiments.

FIG. 3 is a flowchart depicting the operation protection method according to certain embodiments.

The operation protection method may be applied to only one operation, to all the operations or to a set of selected operations among the set of successive operations defined in a starting ring A by the cryptographic scheme. The number of protected operations may depend on the cryptographic scheme itself and/or the level f protection required. Further, the operation protection method may be applied to only one round or to a number of rounds, depending on the application of the invention and/or criteria related to the attacks such as the values that are identified as being targetable by an attacker. For example, in the AES, an attacker will generally introduce a fault in the last round or the before last round. The protection method may thus be applied at least for the last two rounds in this example.

The operation protection method applies to each target operation of the set of successive operations, the target operation being defined in a basis ring corresponding to the quotient of the starting ring A by a basis ideal J. The operation protection method starts with the reception of the current state of the data block (for example block of a message) in step 300. The state of the message may have undergone several changes as a result of the previous operations (whether protected or not).

In step 302, the current state m of the data block may be modified, for example by deriving a modified state m' from the current state.

In step 304, the operation to be protected is executed in each reference ring $A/I_k$ (303), which provides a reference value $C_k$ corresponding to the result of the execution of the operation in the reference ring $A/I_k$. Each reference ring represents the quotient of the starting ring A by a reference ideal $I_k$.

In step 307, the operation to be protected is further executed in each extended ring (306) of a set of extended rings $A/(JI_{k1}I_{k2}\ldots I_{kN})$, each extended ring depending on one or more extended rings $A/I_{k1}, A/I_{k2}, \ldots, A/I_N$, which provides an intermediary extension value $C_{r,\ k1k2\ldots\ kN}$ for each extended ring $A/JI_{k1}I_{k2}\ldots I_{kN}$ (the number N is inferior or equal to the number of reference rings). Each extended ring $A/JI_{k1}I_{k2}\ldots I_{kN}$ corresponding to one or more reference ring $A/I_{k1}, A/I_{k2}, \ldots, A/I_N$ represents the quotient of the starting ring A by the product of the basis ideal J and of the reference ideals $I_{k1}, I_{k1}, \ldots, I_{kN}$ of the corresponding reference rings.

In step 312, it is determined if a condition between a reference parameter derived from one or more reference values $C_k$ and an extension parameter derived from the corresponding extension values $C_{r,\ k1k2\ldots\ kN}$ is satisfied.

As used herein an extended ring is referred to as "corresponding to" or "depending on" a particular reference ring if the extended ring is the quotient of the starting ring A by the product of the basis ideal and one or more reference ideals associated with reference rings including that particular reference ring.

In one embodiment, the condition step 312 may comprise, for each reference ring $A/I_k$ (block 310), a comparison between the reference value $C_k$ obtained as a result of the execution of the operation in this reference ring and an extension parameter derived from the intermediary extension values $C_{r,\ k1k2\ldots\ kN}$ obtained as a result of the execution of the operation in extended rings depending on the considered reference ring $A/I_k$ (one of the indexes $k_i$ is equal to k).

If the condition is not satisfied for at least one reference ring, in step 314, a fault attack on the operation is detected and the execution of the operations of the cryptographic scheme may be terminated. In addition a report may be notified to a monitoring device monitoring the operation of the system 100.

If the condition is satisfied for each reference ring, the operation value m" may be determined from the reference values $C_k$ and/or the intermediary extension values $C_{r,k1k2...kN}$ in step 318. The operation value m" may be stored as the new current state of the data block, for use for the execution of the next operation of the cryptographic scheme or the next round of the cryptographic scheme. Otherwise, if all the operations and rounds of the cryptographic scheme have been run, the operation value may be returned to the user.

This allows for high level of assurance of the result integrity. Further, security parameters are related to the size of reference ideal $I_{ki}$ (typically, fault detection probability is equal to $1-1/|I_{ki}|$, the size of $I_{ki}$ being generally a prime).

The protection thus obtained may be complementary to other protection solutions such as physical sensors or higher level checks (verification of computation by checking the initial message if the message is encrypted and then decrypted . . . ).

Figure 4:
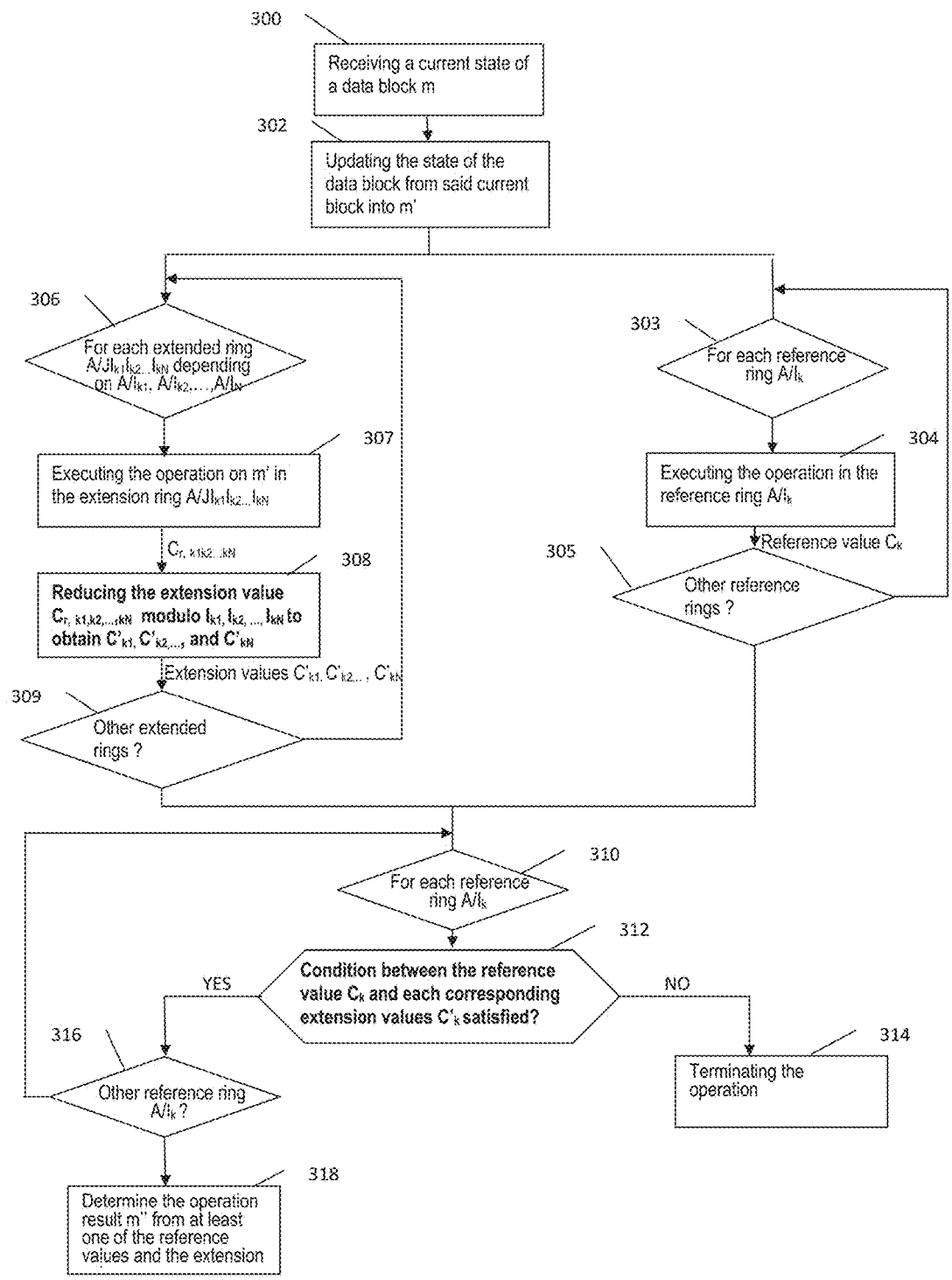
FIG. 4 is a flowchart depicting an embodiment of the invention of the condition step of the protection method.

FIG. 4 is a flowchart depicting an embodiment of the invention in which the condition step is determined from an extension parameter computed for each intermediary extension value. The main steps of the flowchart of FIG. 4 are similar to the flowchart of FIG. 3, but the operation protection method further comprises for each intermediary extension value $C_{r,k1k2...kN}$ the step of reducing each byte of the intermediary extension value modulo each reference ideal $I_{k1}, I_{k2}, \ldots I_{kN}$ to obtain a set of extension values per reference ring $C'_{k1}, C'_{k2}, \ldots,$ and $C'_{kN}$ (i.e. for each reference ring $I_{ki}$, each byte of the intermediary extension value is mapped to an element of the reference ring $I_{ki}$, which provides a mapped value for each reference ring comprising the mapped bytes in correspondence with the bytes of the intermediary extension value, the set of extension values $C'_{k1}, C'_{k2}, \ldots,$ and $C'_{kN}$ comprising the mapped values).

Further, in such embodiment, the extension parameter is derived from each extension value $C'_k$ obtained from the execution of the operation in an extended ring depending on the reference ring $A/I_{ki}$, in step 312. More specifically, for each reference ring $A/I_{ki}$, in step 312, it is determined if a condition between the reference value $C_{ki}$ obtained as a result of the execution of the operation in the reference ring $A/I_{ki}$ and an extension parameter derived from the extension values $C'_{ki}$ obtained from the execution 307 of the operation in each extended ring depending on the reference ring $A/I_{ki}$ and the reduction step 308 is satisfied.

Figure 5:
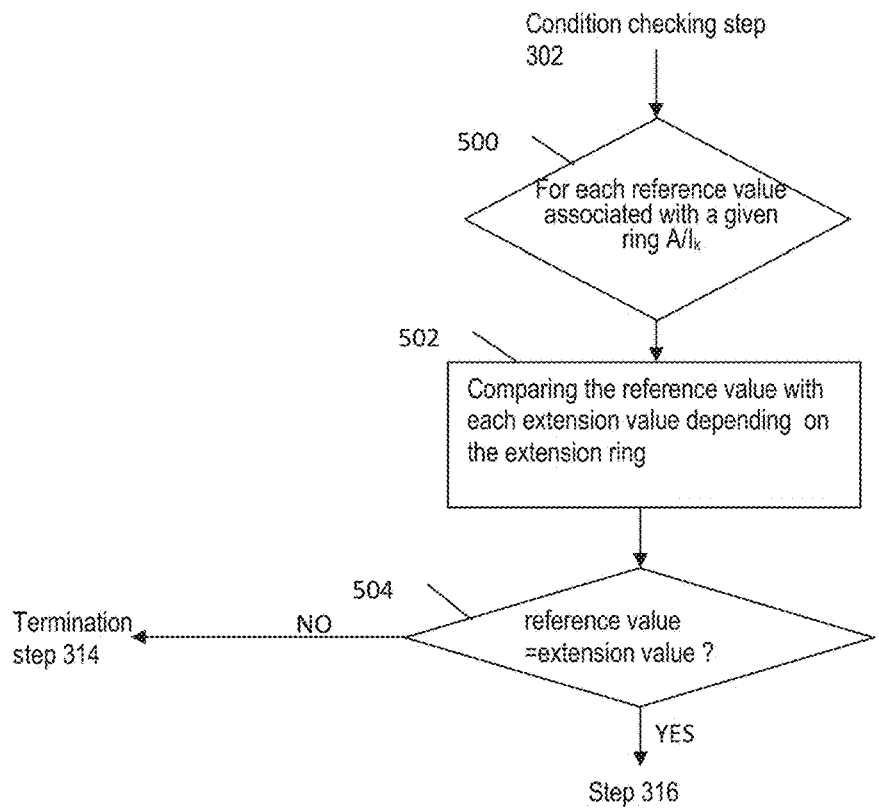
FIG. 5 is a flowchart an alternative embodiment of the condition step of the protection method.

FIG. 5 is a flowchart depicting the condition step 312 according to one particular embodiment. In this embodiment, for each reference ring $A/I_{ki}$ (500), the condition step comprises comparing the reference value $C_{ki}$ obtained as a result of the execution of the operation in the reference ring $A/I_{ki}$ and each extension value $C'_{ki}$ obtained from the operation execution step 307 in an extended ring depending on the reference ring $A/I_{ki}$ and the reduction step 308 (502). Each extension value $C'_{ki}$ per reference ring is thus used as such as the extension parameter. In one embodiment, the condition may comprise comparing the reference value $C_{ki}$ and each extension value $C'_{ki}$, the condition being satisfied if the value $C_{ki}$ and the value $C'_{ki}$ are equal (504). For each reference ring, step 312 may be iterated as many times as the number of extended rings depending on the reference ring.

Figure 6:
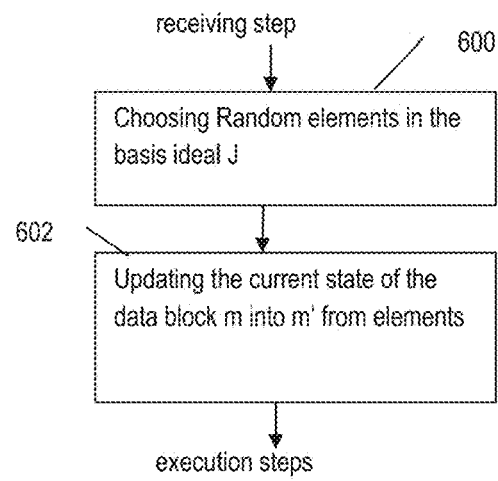
FIG. 6 is a flowchart depicting the step of updating the current state of the data block of the protection method, according to one embodiment.

FIG. 6 is a flowchart depicting the step of updating the current state of the data block m (step 302 of FIGS. 3 and 4) according to one embodiment.

In step 600, a set of K elements of the reference ring are selected. The selection may be performed randomly.

In step 602, the current state of the data block is updated from the K elements selected in the basis ideal J, which modifies the current state of the data block.

Without a modification of the input message block, in certain cases, the operation to execute may not be complex enough. Consequently, the error might not be detected. For example, if m=0, then the data block m will be equal to 0 in every reference ring and every starting ring.

Preferably, the update of the current state may be performed randomly to add a protection against some side-channel analysis such as the DPA.

This step of updating the current state of the data block may be performed using a reduction modulo J. The K elements may be selected in the basis J according to different selection criteria. In particular, the K elements may be randomly selected in the basis J. They may be also randomly pre-computed. Alternatively they may be constant.

It should be noted that a random selection of the K elements in the basis ideal J allows to add a protection against some side-channel analysis such as the DPA.

For example, the cryptographic scheme is AES and the protection method may apply to one of the operation of the AES in the ring $\mathbb{F}_2[X]/(PQ)$, with Q being an irreducible polynomial over $\mathbb{F}_2$ of degree k and P being the ideal of $\mathbb{F}_2[X]$ representing the set of all polynomials that are multiple of P. (P) is referred to as the basis ideal of $\mathbb{F}_2[X]$ with:

$$(P) = \{P, \ldots, XP, X^2P, \ldots, (X+1)P, (X+1)^2P, \ldots\}$$

In such AES exemplary application, step 500 may comprise randomly selecting K polynomial $R_i$ to randomize the message, and step 502 may comprise adding each bit i of the current state of the data bloc $m_i$ to $PR_i$, where $PR_i$ is a polynomial binary multiplication.

In the embodiment where extension values $C'_k$ per reference ring $A/I_k$ are computed from the execution of the operation in an extended ring depending on the reference ring $A/I_k$ (step 307) and the reduction step (step 308), the operation protection method may comprise checking an auxiliary condition related to the reference values and/or the extension values per reference ring $C'_k$, if all the iterations of the condition step 312 succeed, before returning an operation value in step 318.

Figure 7:
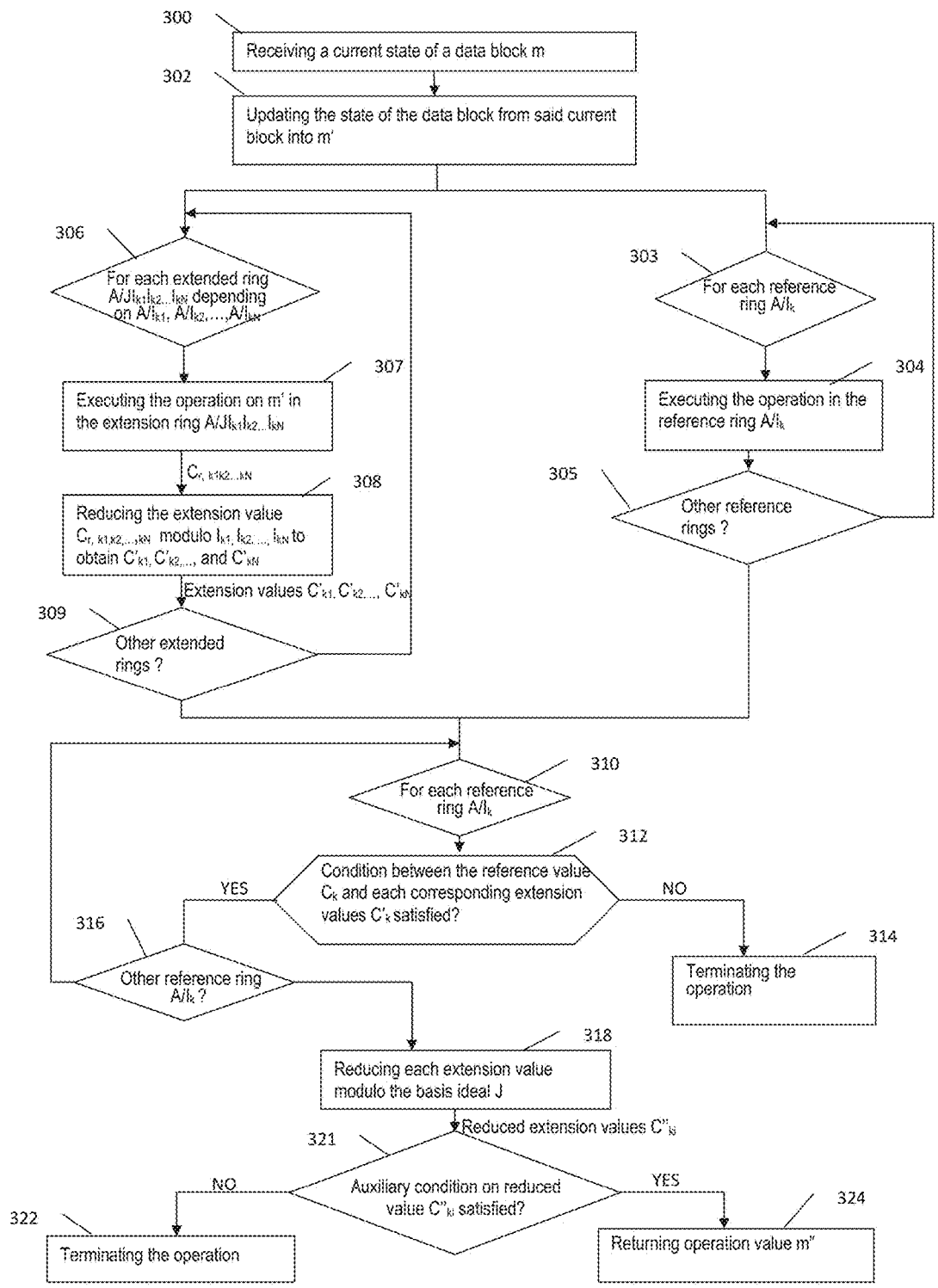
FIG. 7 is a flowchart depicting the protection method including an auxiliary condition according to an embodiment.

FIG. 7 is a flowchart depicting the protection method including an auxiliary condition according to such embodiment.

The steps of the flowchart of FIG. 7 are similar to the steps of the flowchart of FIG. 4, but the operation protection method further comprises, if the main condition of step 312 is satisfied for all the reference values, a step 319 comprising, for each extension value, the reduction of each byte of the extension value per reference ring $C'_k$ modulo the basis ideal J, which provide $C''_k$ (i.e. each byte of the extension value per reference ring $C'_k$ is mapped to an element of the basis ring J, the mapped value thus obtained providing the extension value $C''_k$).

The auxiliary condition may be checked in step 321. Step 321 may comprise determining whether the reduced extension value $C''_k$ obtained in correspondence with the reference ring are equal. If at least one reduced extension value $C''_k$ differs from the other reduced extension values, an error is detected which may be representative of a fault attack and the execution of the operations is terminated in step 322 similarly to step 314. Otherwise (i.e; all the reduced extension value $C''_k$ are equal), the operation result is returned in step 324 similarly to step 318 of FIG. 4.

In one embodiment, the operation protection method may comprise the execution of the operation in only one extended ring in step 307 and the execution of the operation in a set of reference rings.

Figure 8:
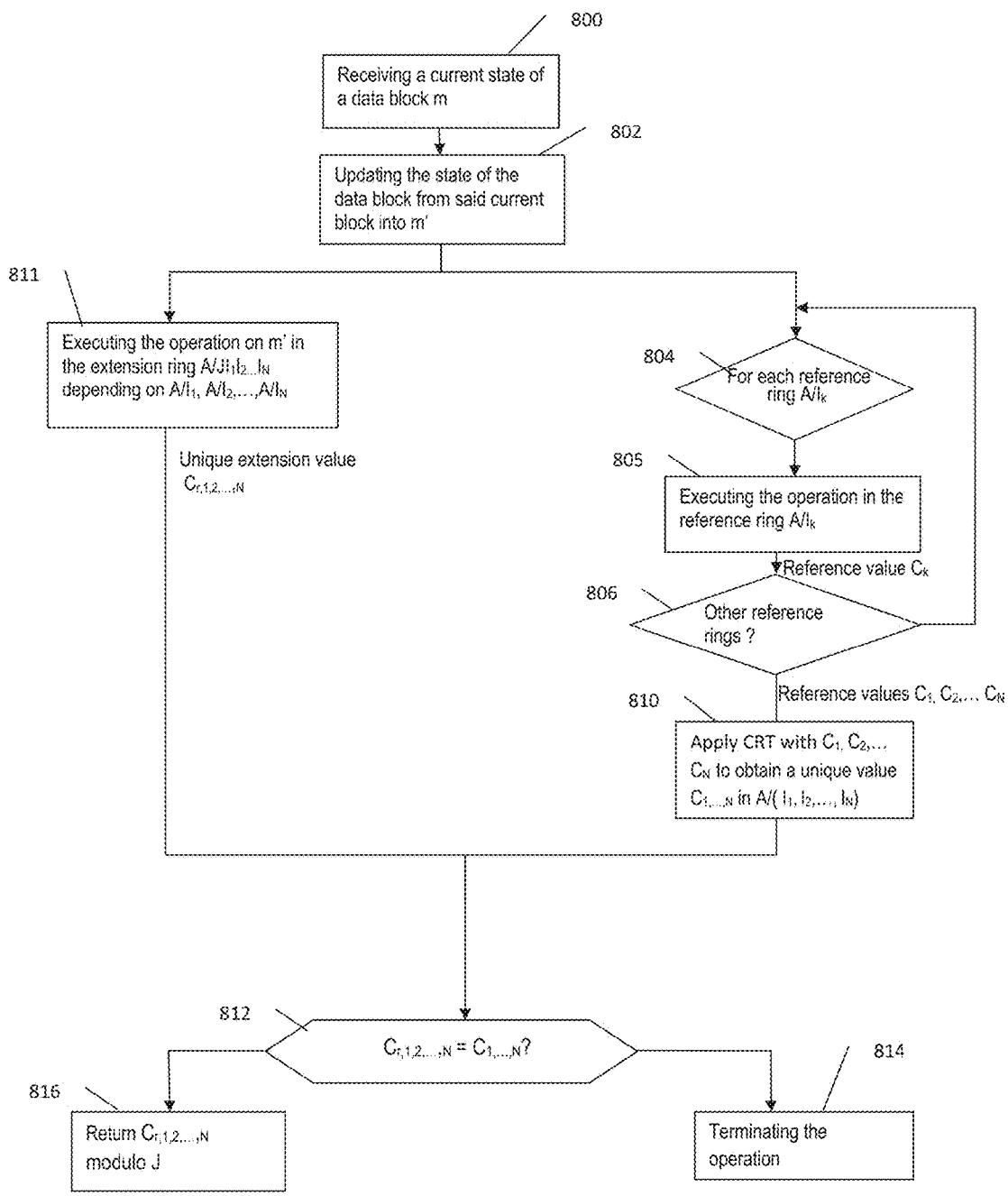
FIG. 8 is a flowchart depicting an embodiment comprising the execution of the operation in one extended ring and the execution of the operation in several reference rings, according to certain embodiments.

FIG. 8 is a flowchart depicting such an embodiment with the execution of the operation in one extended ring and the execution of the operation in several reference rings, according to certain embodiments. Steps 800, 802, 804, 805, 806 are respectively similar to steps 300, 302, 304, 305, and 306 of FIG. 3. Step 811 is similar to step 307 of FIG. 4.

However, in step 810, a Chinese Remainder Theorem (CRT) transformation may be applied to the N reference values $C_1, \ldots, C_k, \ldots C_N$ obtained as a result of the execution of the operation in each reference ring among the N reference rings $A/I_1, \ldots, A/I_k, \ldots, A/I_N$, which provides a unique value derived from the N reference values, referred to hereinafter as the reference parameter.

In step 812, the condition comprises a comparison between the reference parameter and the unique extension value $C_{r,1,2,\ldots,N}$ obtained as the result of the execution of the operation in the unique extended ring $A/JI_1I_2\ldots I_N$ (step 811).

A unique iteration of the condition step 812 is thus performed. In particular, the condition may comprise determining if the extension value $C_{r,1,2,\ldots,N}$ is equal to the reference parameter $C_{1,\ldots,N}$ and, if not terminating the operations of the cryptographic scheme in step 814 as described previously in relation to step 318 of FIG. 3. Otherwise, if the condition is satisfied ($C_{r,1,2,\ldots,N}=C_{1,\ldots,N}$), each byte of the extension value or the reference parameter may be reduced modulo the basis ideal J (i.e. each byte of the extension value or the reference parameter may be mapped to an element of the basis ring J, which provides a mapped value formed by the mapped bytes corresponding to the bytes of the extension value or the reference parameter) and the reduced value (corresponding to the mapped value) may be returned as the operation result m" in step 816. The execution of the remaining cryptographic operations or round may proceed based on the state m" of the data block, while ensuring that no fault attack has been performed on the operation.

A CRT (Chinese Remainder Theorem) transformation provides that if I,J are two coprime ideals in A, then, there exists an isomorphism between the quotient ring A/(IJ) and A/I×A/J. That is for a pair (a, b) with a∈A/I and b∈A/J, there exists an unique corresponding element in A/(IJ). Reciprocally, for any element x∈A/(IJ) there exists a unique pair of elements in A/I×A/J corresponding to x. The Chinese Remainder Theorem can also be generalized to several ideals pairwise coprime.

Step 810 uses specifically the CRT transformation $A/I_1 \times A/I_2 \times \ldots \times A/I_N \to A/(I_1 \ldots I_N)$ to determine $C_{1,\ldots,N} \in A/(I_1 \ldots I_N)$ from $(C_1, C_2, \ldots C_N) \in A/I_1 \times A/I_2 \times \ldots \times A/I_N$.

This comprises defining $i_{1,\ldots,k} \in I_1 \ldots I_k$, such that $i_{1,\ldots,k} + i_{k+1} = 1$ for some $i_{k+1} \in I_{k+1}$. They can be computed using an extended Euclidean algorithm. This also comprises defining $x_{1,\ldots,k}$ the element verifying:

$$x_{1,\ldots,k} = C_1 \bmod I_1$$

$$x_{1,\ldots,k} = C_k \bmod I_k$$

The seek value $C_{1,\ldots,N} \in A/(I_1 \ldots I_N)$ will be obtained as $C_{1,\ldots,N} = x_{1,\ldots,N}$.

$x_{1,\ldots,N}$ may be recursively constructed according to the CRT as follows:
1. At the beginning, $x_1$ is set as equal $C_1$ ($x_1 = C_1$).
2. $x_2$ is then set as equal to $x_2 = x_1 + (C_2 - x_1)i_1 \bmod I_1 I_2$.
3. $x_{1,\ldots,k,k+1}$ is then constructed from $$x_{1,\ldots,k,k+1} = x_{1,\ldots,k} + (C_{k+1} - x_{1,\ldots,k,k+1})I_{1,\ldots,k} \bmod I_1 \ldots I_k J_{k+1}$$

$C_{1,\ldots,N}$ is then obtained for k+1=N ($C_{1,\ldots,N} = x_{1,\ldots,N-1,N}$).

Figure 9:
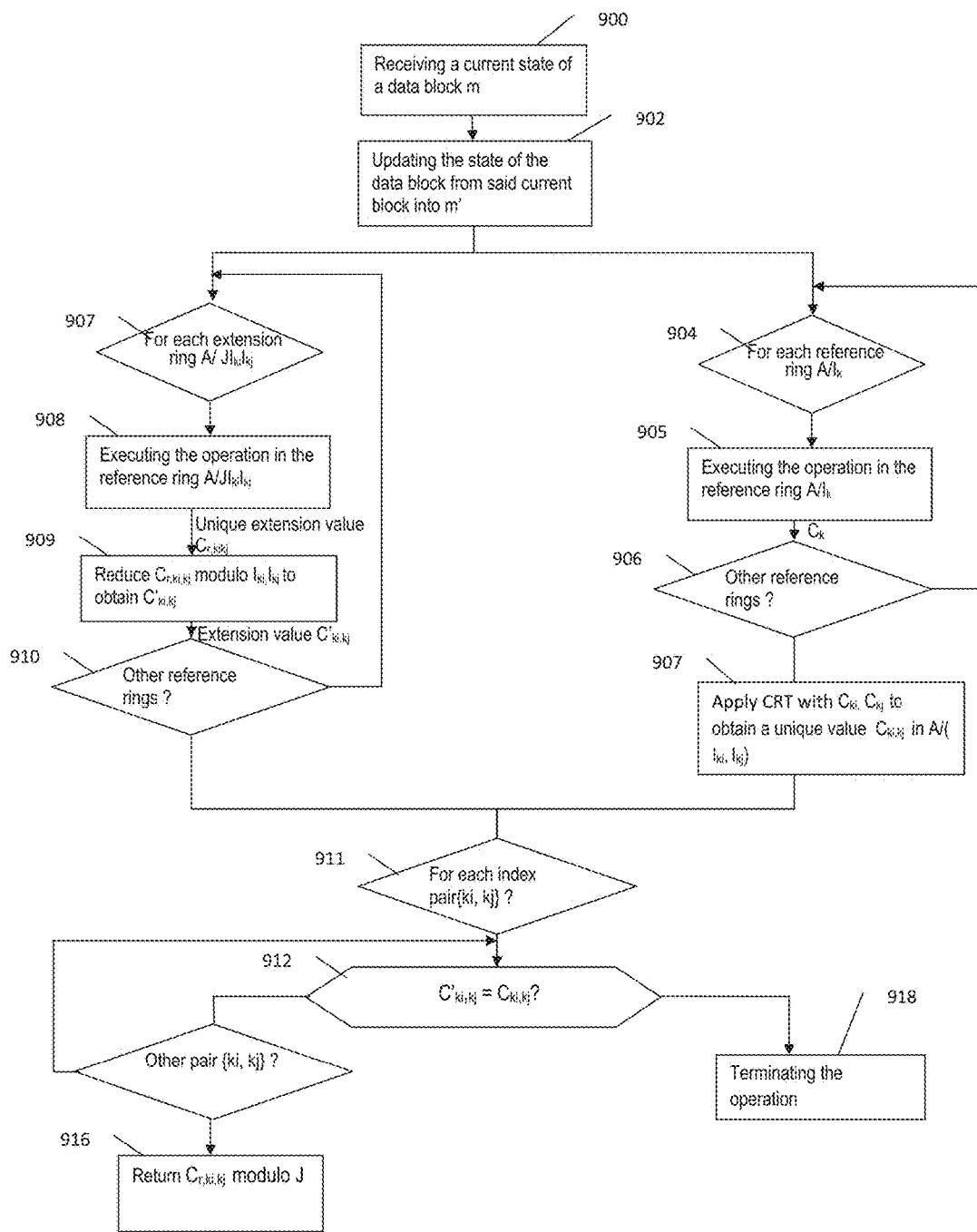
FIG. 9 is a flowchart depicting an exemplary embodiment of the operation protection method.

FIG. 9 is a flowchart illustrating another exemplary embodiment of the operation protection method comprising the execution of the operation in a set of extended rings and the execution of the operation in a set of reference rings, each extended ring $A/JI_{ki}I_{kj}$ being the quotient of the starting ring A by the product of the basis ideal J and of the reference ideals $I_{ki}, I_{kj}$ of two reference rings $A/I_{ki}$ and $A/I_{kj}$. Steps 900, 902, 904, 905, 906 are respectively similar to steps 300, 302, 304, 305, and 306 of FIG. 4. Step 907 and 908 are similar to step 307, and 308 of FIG. 4.

The execution of the operation in each reference ring $A/I_k$ (steps 904, 905) provides a reference value $C_k$. In step 910, a CRT is applied to a set of pairs of reference values $\{C_{ki}, C_{kj}\}$ obtained as a result of the execution of the operation in each reference ring $A/I_{ki}$ and $A/I_{kj}$, which provides a unique reference value $C_{kikj}$ for the pair of reference rings $\{A/I_{ki}, A/I_{kj}\}$, referred to hereinafter as a pair reference parameter.

The operation is further executed in each reference ring $A/JI_{ki}I_{kj}$ (step 908) depending on a reference rings, $A/I_{ki}$ and $A/I_{kj}$, for each pair of reference rings $\{A/I_{ki}, A/I_{kj}\}$, which provides an intermediary extension value $C_{r,ki,kj}$. In step 909, each byte of the extension value $C_{r,ki,kj}$ thus obtained is reduced modulo the product $I_{ki}I_{kj}$, which provides a pair extension value $C'_{ki,kj}$ for each extended ring (i.e. each byte of the extension value $C_{r,ki,kj}$ is mapped to an element of a ring $A/I_{ki}I_{kj}$ quotiented by the product $I_{ki}I_{kj}$ of the reference ideals, which provides a mapped value comprising the mapped bytes in correspondence with the bytes of the extension value, the mapped value forming the pair extension value $C'_{ki,kj}$).

The condition step 912, is iterated for each pair of reference rings $\{A/I_{ki}, A/I_{kj}\}$. For each pair of reference rings $\{A/I_{ki}, A/I_{kj}\}$, step 912 comprises checking a condition comprising a comparison between the pair reference parameter $C_{kikj}$ and the corresponding pair extension value $C_{kikj}$ obtained as the result of the execution of the operation in the extended ring $A/JI_{ki}I_{kj}$ (step 908) and the reduction step 909.

In particular, the condition may comprise determining if the pair extension value $C'_{kikj}$ is equal to the pair reference parameter $C_{kikj}$ and, if not terminating the operations of the cryptographic scheme in step 914 as described previously. Otherwise, if the condition is satisfied ($C'_{kikj} = C_{kikj}$), each byte of the extension value or the reference parameter may be reduced modulo the basis ideal J (i.e. each byte of the extension value or the reference parameter is mapped to an element of the basis ring J, which provides a mapped value formed by the mapped bytes in correspondence with the bytes of the extension value) and the reduced value (corresponding to the mapped value) may be returned as the operation result m" in step 916 as described in relation with FIG. 3 to proceed with the execution of the remaining cryptographic operations or round.

The CRT operation applied in step 910 is the CRT transformation $A/I_{ki}, A/I_{j} \to A/(I_{ki}I_{kj})$.

According to this CRT transformation operation, if $I_{ki}$ and $I_{kj}$ are coprime, there exists $i \in I_{ki}$ and $j \in I_{kj}$ such that $i+j=1$. An element $C_{kikj} \in A/(I_{ki}I_{kj})$ is obtained from $(C_{ki}, C_{kj}) \in A/$ $I_{ki} \times A/I_{kj}$. In other terms, $C_{kikj} \in A/(I_{ki}I_{kj})$ may be determined such that $C_{kikj} = C_{ki}$ mod $I_{ki}$ and $C_{kikj} = C_{kj}$ mod $I_{kj}$.

This comprises finding the elements i, j, using for example the Extended Euclidean Algorithm. They can also be pre-computed and stored. $C_{kikj}$ is then set as $x = C_{kj}j + C_{ki}i$ mod $I_{ki}I_{kj}$.

Alternatively $C_{kikj}$ can also be computed as $C_{kikj} = (C_{ki} - C_{kj})j + C_{kj}$ mod $I_{ki}I_{kj}$. In that way, only j has to be computed.

While the embodiment of FIG. 9 has been described with reference to an example where the operation is executed in three reference rings, and in two extended rings, each extended ring depending on a pair of the reference rings, to facilitate the understanding of this embodiment, more generally this embodiment may be used to execute the operation in:

any number of reference rings (904), and in at least two extended rings (907), each extended ring depending on a set of reference rings.

According to this embodiment, the operation protection method may comprise:

applying the CRT transformation (910) to the reference values obtained as a result of the execution of the operation in each set of reference rings corresponding to one of the extended ring, which provides a common reference parameter related to each said set of reference rings, for each extension value obtained as a result of the execution of the operation in one of the extended ring depending on a given set of reference rings, reducing each byte of the extension value modulo the product of the reference ideals of each reference ring of the set of reference rings (908), with provides a common extension parameter.

The condition step (912) may then comprise a comparison between each common reference parameter related to a given set of reference rings and the common extension parameter obtained for the extended rings depending on this set of reference rings.

Even if not limited to symmetric cryptographic schemes, the invention has particular advantages to protect the cryptographic operations against fault attacks in symmetric cryptographic schemes (the same key is used for encryption and decryption as opposed to a public key cryptosystem), and in particular for a AES cryptographic scheme.

Figure 10:
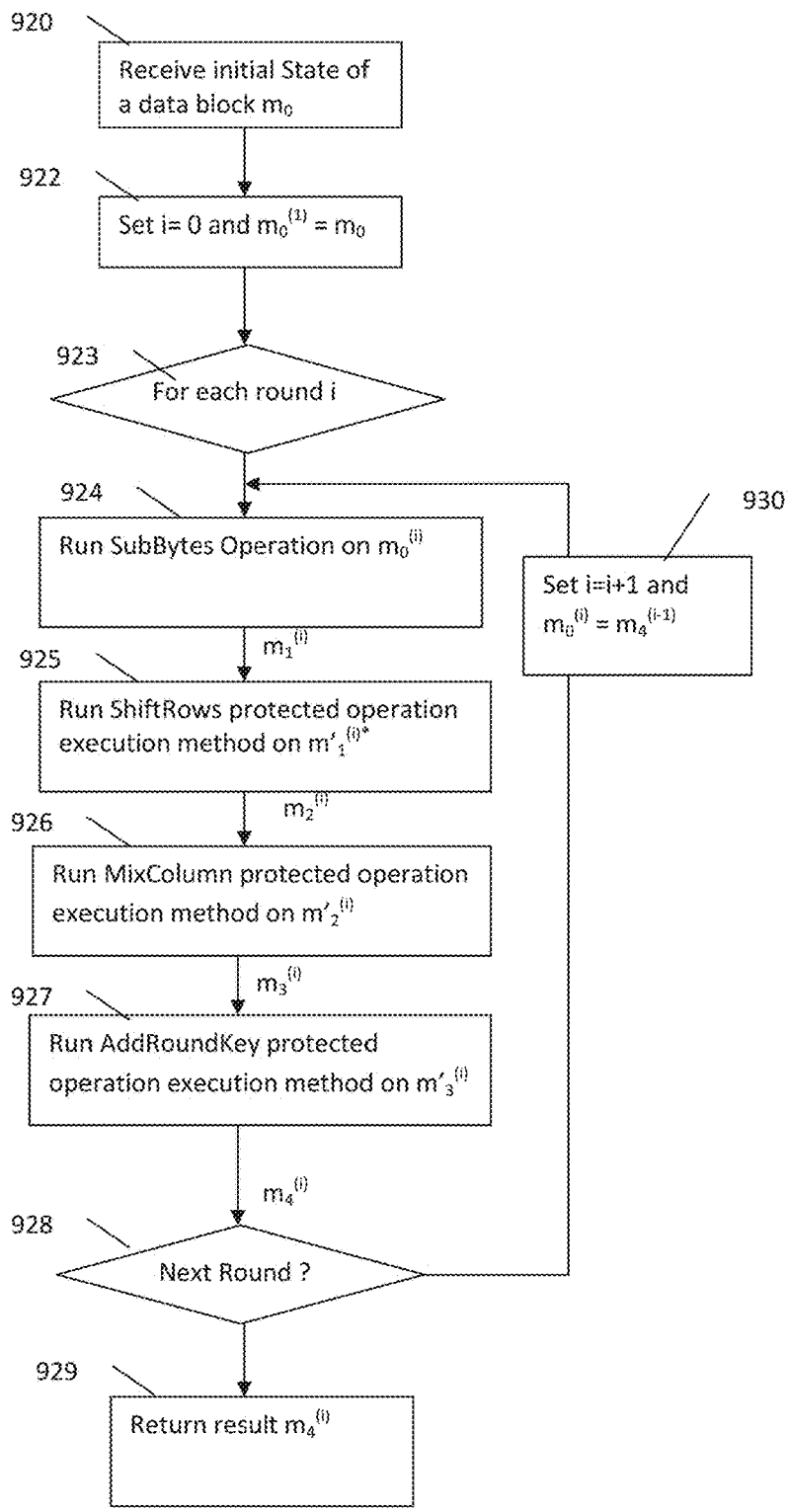
FIG. 10 is a flowchart depicting an exemplary application of the invention to certain operations of the AES cryptographic scheme.

FIG. 10 is a flowchart illustrating an exemplary application of the invention to certain operations of the AES cryptographic scheme. The flowchart of FIG. 10 is similar to the flowchart of FIG. 2 but some AES operations are protected according to the protection method.

The Advanced Encryption Standard (AES) is the specification of a symmetric encryption scheme standardized in 2001.

The AES cryptographic scheme consists in performing rounds (or repetitions) of a set of successive operations on a 128-bit data block (or message). It supports three different key lengths and the number of rounds is fixed for each key length:

for a 128-bit key, the number of rounds is 10
for a 192-bit key, the number of rounds is 12
for a 256-bit key, the number of rounds is 14

Figure 11:
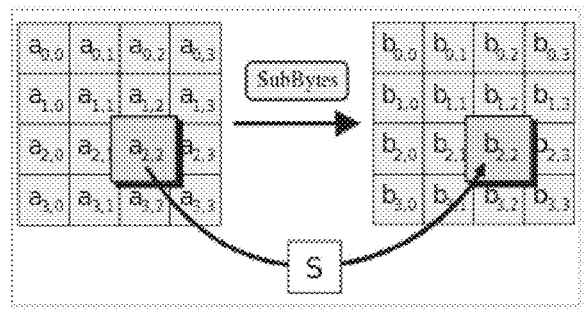
FIG. 11 represents a subBytes operation of the AES scheme.
Figure 12:
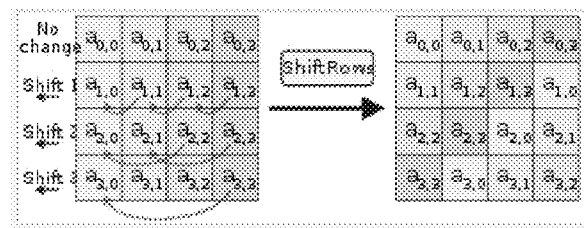
FIG. 12 represents a shiftRows operation of the AES scheme.
Figure 13:
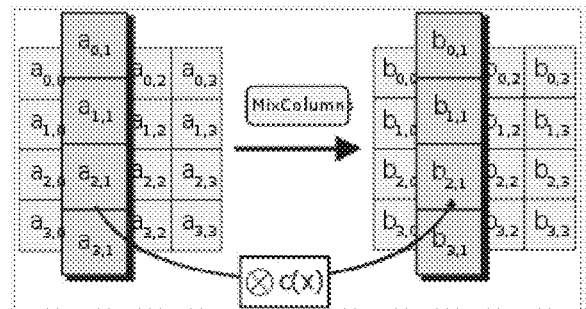
FIG. 13 represents a MixColumns operation of the AES scheme.
Figure 14:
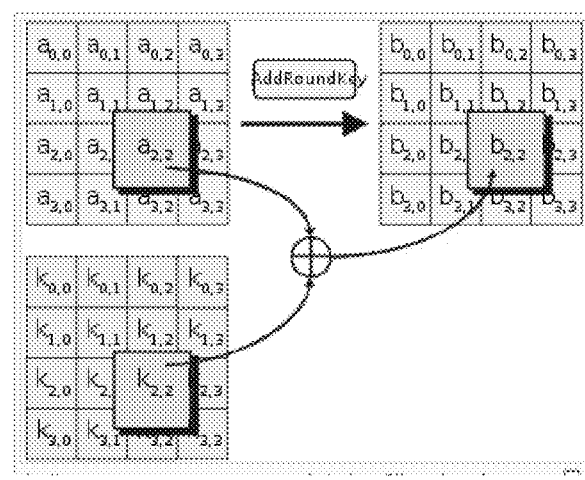
FIG. 14 represents a AddRoundKey operation of the AES scheme.

The AES cryptographic scheme comprises 4 different operations operating on a 128-bit block represented by a matrix of 4×4 bytes:

a subBytes operation according to which each byte of the current state of the data block is replaced with its entry in a fixed 8-bit lookup table S (bij=S(aij)) as illustrated in FIG. 11.

a shiftRows operation according to which the bytes in each row of the current state of the data block are shifted cyclically to the left, the number of places each byte is shifted differing for each row as illustrated in FIG. 12.

a MixColumns operation according to each column of the current state of the data block is multiplied with a fixed polynomial c(x) as illustrated in FIG. 13, and an AddRoundKey operation according to which each byte of the current state of the message is combined with a byte of the round subkey using XOR operation, as represented in FIG. 14.

The AES uses a representation of the binary values included in each data blocks into ring of polynomials $\mathbb{F}_2[X]$ (corresponding to the starting ring A) where all polynomials are representations of the binary values.

The polynomial ring $\mathbb{K}[X]$ over a field $\mathbb{K}$ is defined as the set of expressions, called polynomials in X of the form:

$$P = a_0 + a_1 X + a_2 X^2 + \ldots + a_{n-1} X^{n-1} + a_n X^n$$

where $a_0, a_1, \ldots, a_n$ are elements of $\mathbb{K}$. They are called coefficients of P. If $a_n \neq 0$, n is called the degree of P.

The quotient ring $\mathbb{K}[X]/(P)$ is the ring containing polynomials over $\mathbb{K}[X]$ where two polynomials Q, R are identical on $\mathbb{K}[X]/(P)$ if their remainder of the division by P is the same.

This means that Q and Q+RP are identical on $\mathbb{K}[X]/(P)$ for any R in $\mathbb{K}[X]$.

The elements of $\mathbb{K}[X]/(P)$ are represented by a polynomial of degree smaller than n. Generally, additions and multiplications in $\mathbb{K}[X]/(P)$ are performed modulo P thus the result is a polynomial of degree smaller than n.

One property is that if P is irreducible, $\mathbb{K}[X]/(P)$ is a field.

If $\mathbb{K}$ is a finite field of m element, and P is an irreducible polynomial of degree n, then $\mathbb{K}[X]/(P)$ is a field of degree $m^n$. It can thus be denoted $\mathbb{Q}_{m^n}$ (see previous sections).

$\mathbb{Q}_{m^n}$ can be represented by any irreducible polynomial over $\mathbb{Q}_m$ of degree n.

Most operations of the AES cryptographic scheme (Subbytes, MixColumns and AddRoundKey) are defined specifically on a basis field called the Rijndael's finite field and noted $\mathbb{Q}_{256}$ with the reducing polynomial $P = X^8 + X^4 + X^3 + X + 1$ defined over $\mathbb{Q}_2[X]$.

$\mathbb{Q}_{256}$ can also be denoted $\mathbb{Q}_2[X]/(X^8 + X^4 + X^3 + X + 1)$.

In the embodiment of FIG. 10, the operation protection method is applied to each of the following operations, for each round:

the shiftRows operation (step 925);
the MixColumns operation (step 926), and
the AddRoundKey operation (step 927).

The execution of the subBytes operation (923) may be performed according to the convention method in the Rijndael's finite field.

Alternatively, the operation protection method may be applied to only some of the previous operations, during one round, all the rounds or a selected number of rounds.

Figure 15:
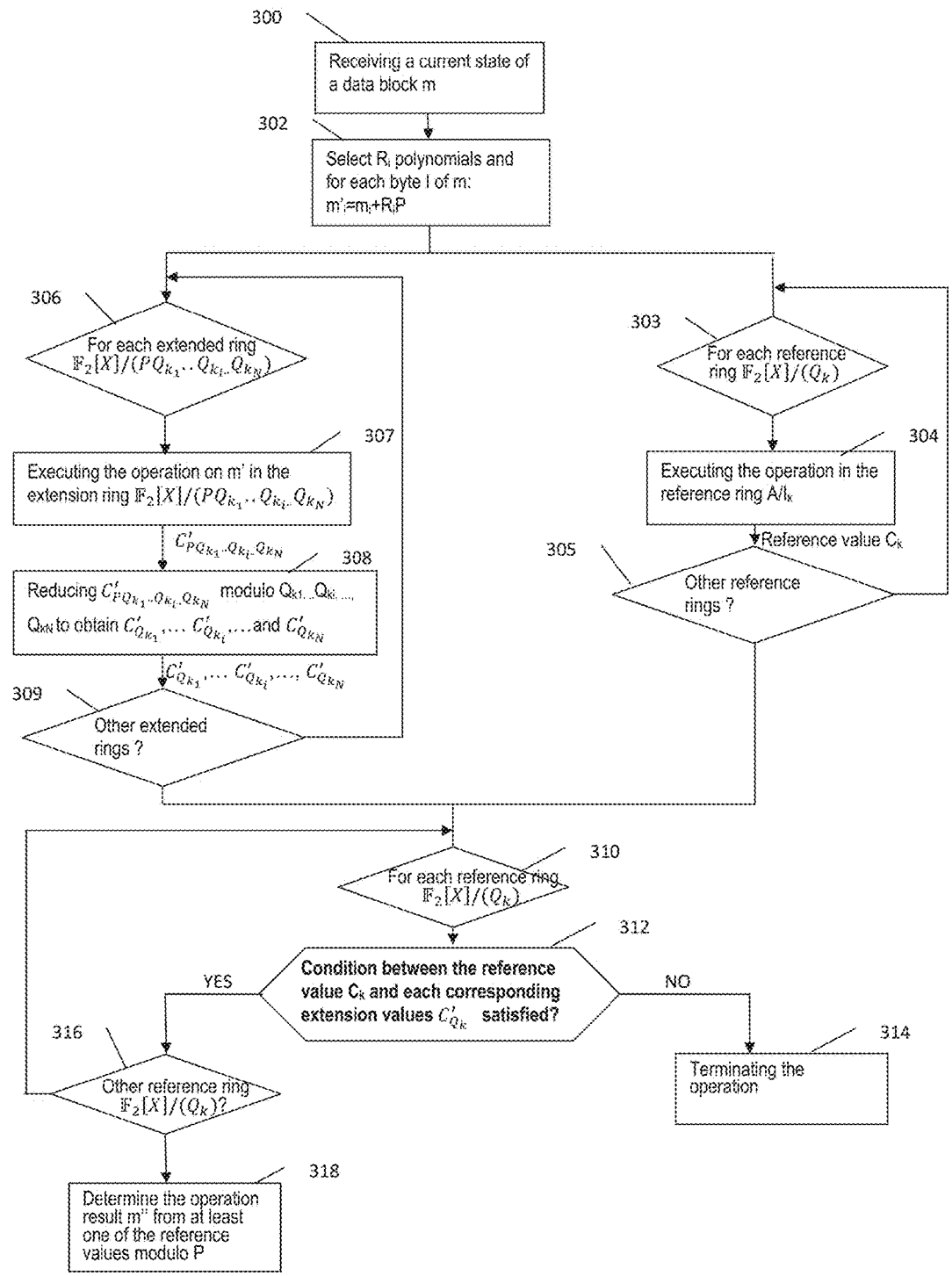
FIG. 15 is a flowchart illustrating an exemplary application of the invention to one operation of the AES cryptographic scheme, according to one embodiment.

FIG. 15 is a flowchart illustrating an exemplary application of the invention to one operation of the AES cryptographic scheme, corresponding to the embodiment of FIG. 3. To facilitate the understanding of this application, similar reference numbers as the reference numbers used in FIG. 3 will be used, although the flowchart of FIG. 15 corresponds to a particular embodiment and application.

In the following description Q is an irreducible polynomial over $\mathbb{F}_2[X]$ of degree k.

In step 302, a number of random polynomials of degree k are chosen (for example 16 random polynomials). This comprising choosing random bit strings of length k. Each bit represents the coefficient of the polynomial. The use of random polynomials allows protection against side-channel attacks. For protection against fault attacks only, constant polynomials may be alternatively loaded from the ROM.

The selected polynomials $R_i$ are used to randomize the message. Each byte of the message $m_i$ is added to $PR_i$, using a polynomial binary multiplication, which provides the modified state of the message.

In step 304, the AES operation is run on each reference ring $\mathbb{F}_2[X]/(Q_k)$ with the polynomial $Q_k$ representing the reference ideal of the reference ring $\mathbb{F}_2[X]/(Q_k)$, which provides a reference value $C_{Q_k}$ for each reference ring.

In step 307, the AES operation is performed in each extended ring $\mathbb{F}_2[X]/(PQ_{k_1} \ldots Q_{k_i} \ldots Q_{k_N})$, P being the basis ideal of the basis ring, N being inferior or equal to the total number of reference rings, and $Q_{ki}$ representing the reference ideal of one of reference rings $\mathbb{F}_2[X]/(Q_{k_i})$ on which the extended ring depends, which provides an intermediary extension value $C'_{PQ_{k_1} \ldots Q_{k_i} \ldots Q_{k_N}}$ for each extended ring $\mathbb{F}_2[X]/(PQ_{k_1} \ldots Q_{k_i} \ldots Q_{k_N})$.

In step 308, each byte of the result $C'_{PQ_{k_1} \ldots Q_{k_i} \ldots Q_{k_N}}$ obtained for each extended ring $\mathbb{F}_2[X]/(PQ_{k_1} \ldots Q_{k_i} \ldots Q_{k_N})$ is reduced modulo each polynomial $Q_{k_i}$, which provides N extension values $$C'_{Q_{k_1}}, \ldots C'_{Q_{k_i}}, \ldots \text{and } C'_{Q_{k_N}}$$

for the considered extended ring $\mathbb{F}_2[X]/(PQ_{k_1} \ldots Q_{k_i} \ldots Q_{k_N})$.

Each reduced result $$C'_{Q_{k_i}}$$

is then equivalent to a result of the AES operation that would have been obtained from the execution of the AES operation over the field $\mathbb{F}_2[X]/(Q_{k_i})$.

In step 312, for reference ring $\mathbb{F}_2[X]/(Q_k)$(block 310), it is determined if each reference value $C_{Q_k}$ obtained as a result of the execution of the operation on the reference ring $\mathbb{F}_2[X]/(Q_k)$ (step 304) is equal to the different extension values $C'_{Q_k}$ obtained in step 308 for the extended ring $\mathbb{F}_2[X]/(PQ_{k_i} \ldots Q_{k_i} \ldots Q_{k_m})$ depending on this reference ring $\mathbb{F}_2[X]/(Q_k)$ (one of the indexes $k_i$ is equal to k).

If the condition of step 312 is satisfied for each reference value $C_{Q_k}$ and each corresponding extension value $C'_{Q_k}$, each byte of at least one extension value $C'_{Q_k}$ is further reduced modulo P in step 318. The obtained result is then equivalent to a result that would have been directly obtained from the execution of the AES operation in the field $\mathbb{F}_2[X]/(P)$. The obtained value may be returned in step 318 and may be used for the remaining AES operations or round as the new state of the data block. In one embodiment, as described in relation with steps 318 to 324 of FIG. 7, all or a subset of the extension values obtained as a result of step 306 to 308 may be reduced modulo P and compared all together, the detection of a mismatch between two reduced extension values triggering an error report and/or a termination of the operations.

Otherwise, if it is determined in step 312 that at least one reference value $C_{Q_k}$ is different from one corresponding extension value $C'_{Q_k}$, an error has occurred which may stem from a fault attack and no result may be returned. The operations may be terminated in step 314.

It should be noted that the above description of the flowchart of FIG. 12 corresponds to a simplified embodiment of the operation protection method with only one reference ring and one extended ring. The skilled person will readily understand that the AES application is not limited to such embodiment and also applies to the use of a plurality of reference rings using several polynomials $Q_1, \ldots, Q_N$ as the reference ideals, and to several extended rings depending on one or more reference rings as described in relation with FIGS. 3, 4, 5, 6, 7, 8 and 9.

While embodiments of the invention have been illustrated by a description of various examples, and while these embodiments have been described in considerable detail, it is not the intention of the applicant to restrict or in any way limit the scope of the appended claims to such detail. The invention in its broader aspects is therefore not limited to the specific details, representative methods, and illustrative examples shown and described. In particular, the operation protection method may be applied to execute one or more operations of a same cryptographic scheme (also known as a cryptographic algorithm), during one or more rounds. Further the invention may apply to any symmetric or asymmetric cryptographic scheme. Also the operation protection method may use any condition 312 between a reference parameter derived from the reference values of one or more reference rings and an extension parameter derived from the corresponding extended rings. Also the skilled person will readily understand that the step of executing the considered operation in the extended rings (306-309) may be implemented according to any order with respect to the step of executing the considered operation in the reference rings (303-305), independently of the reference numbers used to reference these steps. For example, the step of executing the considered operation in the extended rings (306-309) may be implemented simultaneously, before or after the step of executing the considered operation in the reference rings (303-305).

The invention claimed is:

1. A device for executing an operation of a cryptographic scheme, said operation being applied to a given current state of a data block of original data, said operation being defined in a basis ring corresponding to the quotient of a starting ring by a basis ideal generated by at least one element of the starting ring, wherein said device comprises:
   one or more processors configured to:
      execute the operation from a state derived from said current state of the data block, in at least one reference ring, which provides a reference value for each reference ring, each reference ring being the quotient of said starting ring by a reference ideal, and
      execute the operation from said state derived from said current state of the data block in at least one extended ring corresponding to one or more of said reference rings, which provides at least one extension value for each extended ring, each extension value comprises one or more bytes, each extended ring being the quotient of the starting ring by the product of the basis ideal and of the reference ideals of said one or more corresponding reference rings,
      determine the result of said operation from at least one of the reference values and/or of the extension values depending on the verification of a condition between the reference value obtained for each reference ring and the extension values obtained for the extended rings corresponding to said reference ring, map each byte of said at least one extension value to an element of the basis ring, in response to the verification of said condition, for at least one extension value, which provides a mapped value corresponding to said at least one extension value.

2. The device of claim 1, wherein the one or more processors are further configured to:
select a set of elements in the basis ideal;
modify the current state of the data block from said selected elements, which provides said state derived from the current state of the data block.

3. The device of claim 1, wherein the one or more processors are further configured to:
execute said operation from said state derived from the current state of the data block in said extended ring, which provides an intermediary value for each extended ring comprises one or more bytes;
map each byte of the intermediary value resulting from the execution of the operation in said extended ring to an element of the reference ring associated with said reference ring, which provides an extension value corresponding to said reference ring,
wherein said condition comprises a comparison between each reference value and the extension value corresponding to said reference ring.

4. The device of claim 3, wherein said condition is verified if each reference value matches each extension value corresponding to said reference ring, the result of said operation depending on the verification of said condition for each reference value.

5. The device of claim 3, wherein said at least one reference rings comprises a set of two or more reference rings, the one or more processors are further configured to execute said operation in at least two reference rings of said set of reference rings; execute said operation in a unique extended ring depending on all the reference rings of said set of reference rings; apply a CRT transformation to all the reference values determined, which provides a reference parameter related to said set of reference rings, said condition comprising determining if said reference parameter is equal to an element corresponding to the extension value obtained for the extended ring in an ideal represented by the product of the reference ideals of said at least two reference rings.

6. The device of claim 3, wherein the one or more processors are further configured to execute said operation in at least two reference rings; execute said operation in at least two extended rings; each extended ring depending on a set of reference rings; apply a CRT transformation to each reference value determined, which provides a common reference parameter related to each said set of reference rings; for each extension value obtained as a result of the execution of the operation in an extended ring depending on a given set of reference rings, map each byte of the extension value to an element of a ring quotiented by the product of the reference ideals of each reference ring of said set of reference rings, which provides a common extension parameter, wherein said condition comprises comparing each common reference parameter related to a given set of reference rings to the common extension parameter obtained for the extended rings depending on said set of reference rings.

7. The device of claim 1, wherein the one or more processors are further configured to check an auxiliary condition, said auxiliary condition comprising comparing at least some of the mapped values to the reference values; and trigger a termination of the operations of said cryptographic scheme if at least one mapped value differs from a reference value.

8. The device of claim 7, wherein the one or more processors are further configured to return one of the mapped values as the operation result if the auxiliary condition is verified.

9. The device of claim 1, wherein the one or more processors are configured to execute said operation in a plurality of reference rings, which provides a set of reference values; and execute said operation in a unique extended ring corresponding to one or more reference rings.

10. A system for executing a cryptographic scheme comprising a set of successive operations on a given data block of original data using at least one secret key, wherein it comprises the device according to claim 1 configured to protect at least one operation of said cryptographic scheme.

11. The system of claim 10, wherein said operation execution device is applied to each operation of the cryptographic scheme.

12. The system of claim 10, wherein the cryptographic scheme comprises a plurality of rounds, and said operation execution device is applied to protect at least one operation of at least one round.

13. The system of claim 10, wherein the cryptographic scheme is an Advanced Encryption Standard scheme comprising a first non-linear substitution operation at each round, said non-linear substitution operation replacing each byte of a data block with another according to a lookup table, and successive operations.

14. The system of claim 13, wherein said successive operations comprise a final combination operation at each round, said combination operation combining each byte of the state of a data block with a block of the round key using a bitwise XOR operator, and wherein said operation execution device is only applied to the final combination operation at least one round.

15. A method of executing an operation of a cryptographic scheme, said operation being applied to a given current state of a data block of original data, said operation being defined in a basis ring corresponding to the quotient of a starting ring by a basis ideal generated by at least one element of the starting ring, wherein the method comprises executing the operation from a state derived from said current state of the data block, in at least one reference ring, which provides a reference value for each reference ring, and in at least one extended ring corresponding to one or more of said reference rings, which provides at least one extension value for each extended ring, each extension value comprises one or more bytes, each reference ring being the quotient of said starting ring by a reference ideal, and each extended ring being the quotient of the starting ring by the product of the basis ideal and of the reference ideals of said one or more corresponding reference rings; determining the result of said operation from at least one of the reference value and/or of the extension values depending on the verification of a condition between the reference value obtained for each reference ring and the extension values obtained for the extended rings corresponding to said reference ring; and mapping each byte of said at least one extension value to an element of the basis ring, in response to the verification of said condition, for at least one extension value, which provides a mapped value corresponding to said at least one extension value.

16. A method of executing a cryptographic scheme, the cryptographic scheme comprising a succession of operations on at least one data block of original data using at least one secret key, wherein the method applies the method of claim 15 to at least one operation of the cryptographic scheme.

17. A computer program product for executing an operation of a cryptographic scheme, said operation being applied to a given current state of a data block of original data, said operation being defined in a basis ring corresponding to the quotient of a starting ring by a basis ideal generated by at least one element of the starting ring, wherein the computer program product comprises:

a non-transitory computer readable storage medium; and instructions stored on the non-transitory computer readable storage medium that, when executed by one or more processors, cause the one or more processors to;

execute an operation from a state derived from said current state of the data block, in at least one reference ring, which provides a reference value for each reference ring, and in at least one extended ring corresponding to said one or more reference rings, which provides at least one extension value for each extended ring, each extension value comprises one or more bytes, each reference ring being the quotient of said starting ring by a reference ideal, and each extended ring being the quotient of the starting ring by a product of the basis ideal and of the reference ideals of said one or more corresponding reference rings;

determine the result of said at least operation from at least one of the reference value and/or of the extension values depending on the verification of a condition between the reference value obtained for each reference ring and the extension values obtained for the extended rings corresponding to said reference ring; and map each byte of said at least one extension value to an element of the basis ring, response to the verification of said condition, for at least one extension value, which provides a mapped value corresponding to said at least one extension value.

* * * * *

UNITED STATES PATENT AND TRADEMARK OFFICE
CERTIFICATE OF CORRECTION

PATENT NO. : 10,461,922 B2
APPLICATION NO. : 15/391265
DATED : October 29, 2019
INVENTOR(S) : Cedric Murdica and Sylvain Guilley Page 1 of 1

It is certified that error appears in the above-identified patent and that said Letters Patent is hereby corrected as shown below:

In the Claims

In Claim 8, Column 18, Line 4, delete "claim 7" and insert --claim 1--.

In Claim 9, Column 18, Line 9, delete "processors are configured" and insert --processors are further configured--.

Signed and Sealed this
Fourth Day of February, 2020

Andrei Iancu
*Director of the United States Patent and Trademark Office*